(12) United States Patent
Herrero Blanco

(10) Patent No.: US 11,319,604 B2
(45) Date of Patent: May 3, 2022

(54) COPPER COOLING PLATE WITH MULTILAYER PROTRUSIONS COMPRISING WEAR RESISTANT MATERIAL, FOR A BLAST FURNACE

(71) Applicant: ArcelorMittal, Luxembourg (LU)

(72) Inventor: Ignacio Herrero Blanco, Gijon-Asturias (ES)

(73) Assignee: ArcelorMittal, Luxembourg (LU)

( * ) Notice: Subject to any disclaimer, the term of this patent is extended or adjusted under 35 U.S.C. 154(b) by 161 days.

(21) Appl. No.: 16/465,667

(22) PCT Filed: Dec. 30, 2016

(86) PCT No.: PCT/IB2016/058115
§ 371 (c)(1),
(2) Date: May 31, 2019

(87) PCT Pub. No.: WO2018/122591
PCT Pub. Date: Jul. 5, 2018

(65) Prior Publication Data
US 2020/0024677 A1    Jan. 23, 2020

(51) Int. Cl.
*C21B 7/10* (2006.01)
*F27B 1/24* (2006.01)
(Continued)

(52) U.S. Cl.
CPC .............. *C21B 7/106* (2013.01); *B32B 15/04* (2013.01); *B32B 18/00* (2013.01); *F27B 1/24* (2013.01);
(Continued)

(58) Field of Classification Search
CPC ..... B32B 15/04; B32B 18/00; B32B 2311/12; C21B 7/106; F27B 1/24; F27B 3/24; F27D 1/12
(Continued)

(56) References Cited

U.S. PATENT DOCUMENTS

| 4,162,061 A | 7/1979 | Buhler et al. |
| 4,437,651 A | 3/1984 | Cordier et al. |
| 6,641,777 B1 | 11/2003 | Kojo et al. |
| 6,911,176 B2 | 6/2005 | Saarinen |

(Continued)

FOREIGN PATENT DOCUMENTS

| JP | 2012224914 A | 11/2012 |
| JP | 2014227564 A | 12/2014 |

(Continued)

OTHER PUBLICATIONS

International Search Report issued in connection with International application No. PCT/IB2016/058115 dated Sep. 22, 2017.

*Primary Examiner* — Jessee R Roe
*Assistant Examiner* — Michael Aboagye
(74) *Attorney, Agent, or Firm* — Davidson, Davidson & Kappel, LLC

(57) ABSTRACT

A cooling plate for use in a blast furnace is described. The cooling plate has a copper body having an inner face containing ribs parallel therebetween, having first extremities and separated by grooves having second extremities. At least one of these grooves containing at least a part of a multilayer protrusion extending between its second extremities and having at least one layer made of a wear resistant material that increases locally the wear resistance of the neighboring ribs.

15 Claims, 2 Drawing Sheets

(51) Int. Cl.
*F27B 3/24* (2006.01)
*F27D 1/12* (2006.01)
*B32B 18/00* (2006.01)
*B32B 15/04* (2006.01)
*F27D 9/00* (2006.01)

(52) U.S. Cl.
CPC ............. *F27B 3/24* (2013.01); *F27D 1/12* (2013.01); *B32B 2307/30* (2013.01); *B32B 2311/12* (2013.01); *F27D 2009/0043* (2013.01); *F27D 2009/0048* (2013.01); *F27D 2009/0054* (2013.01)

(58) Field of Classification Search
USPC ..... 266/46, 190, 193, 194, 241, 99, 280, 78, 266/286; 29/428; 432/83
See application file for complete search history.

(56) References Cited

U.S. PATENT DOCUMENTS

| | | | | |
|---|---|---|---|---|
| 8,545,752 | B2* | 10/2013 | Maggioli | F27B 1/12 |
| | | | | 266/194 |
| 8,920,709 | B2* | 12/2014 | Maggioli | F27B 1/24 |
| | | | | 266/194 |
| 9,683,783 | B2* | 6/2017 | Maggioli | F27D 1/12 |
| 2006/0279027 | A1 | 12/2006 | Korbik et al. | |
| 2018/0347905 | A1* | 12/2018 | Jastrzebski | C21B 7/06 |

FOREIGN PATENT DOCUMENTS

| | | |
|---|---|---|
| KR | 20030045148 | 6/2003 |
| KR | 101229273 | 2/2013 |
| RU | 2151195 C1 | 6/2000 |
| RU | 2249049 C1 | 3/2005 |
| RU | 2294966 C2 | 3/2007 |
| WO | 2011062261 A1 | 5/2011 |
| WO | 2015097073 A1 | 7/2015 |

* cited by examiner

COPPER COOLING PLATE WITH MULTILAYER PROTRUSIONS COMPRISING WEAR RESISTANT MATERIAL, FOR A BLAST FURNACE

FIELD OF THE INVENTION

The invention relates to blast furnaces, and more precisely to cooling plates (or staves) that are fixed into blast furnaces.

BACKGROUND

As known by one of ordinary skill in the art, a blast furnace generally comprises an inner wall partly covered with cooling plates (or staves).

In some embodiments, these cooling plates (or staves) comprise a body having an inner (or hot) face comprising ribs parallel therebetween and separated by grooves also parallel therebetween. These ribs and grooves are arranged for allowing anchorage of a refractory lining (bricks or guniting) or of an accretion layer inside the blast furnace.

When the body is made of copper or copper alloy, to offer a good thermal conductivity, the ribs are undergoing an early erosion because copper is not a wear resistant material.

To avoid such an early erosion, it is possible to increase the hardness of the ribs by introducing a steel piece in the grooves against the sidewalls of the ribs and the groove base, as described in patent document EP 2285991. Such steel pieces allow a good protection of the ribs, and allow also the staves to expand and deform freely because they are thermally compatible with the stave deformations. But, they are not properly cooled and could be washed out by the gas.

SUMMARY OF THE INVENTION

An objective of various embodiments of the invention is to improve the situation.

The present invention provides a cooling plate (or stave) for use in blast furnace and comprising a copper body having an inner face comprising ribs parallel therebetween, having first extremities opposite therebetween and separated by grooves having second extremities opposite therebetween.

At least one of the grooves of the cooling plate (or stave) comprises at least a part of a multilayer protrusion extending between its second extremities and comprising at least one layer made of a wear resistant material that increases locally the wear resistance of the neighboring ribs.

The cooling plate (or stave) of the invention may also comprise one or more of the following additional features:
  the wear resistant material may be chosen from a group comprising a metal and a ceramic;
    the wear resistant metal may be a wear-resistant steel or cast iron;
    the wear resistant ceramic may be silicon carbide, an extruded silicon carbide or other refractory material with good resistance to spalling and high hardness;
  the multilayer protrusion may comprise a first layer made of a material having a high thermal conductivity, and a second layer made of the wear resistant material and set on top of the first layer;
    the material of the first layer may be chosen from a group comprising a high conductivity metal copper and a copper alloy;
    in one embodiment each multilayer protrusion may be associated to a single groove;
    the multilayer protrusion may further comprise a third layer sandwiched between the first and second layers and made of a material having a hardness intended for increasing hardness of the multilayer protrusion;
      the third layer may be made of a ceramic with good resistance to spalling and high hardness, such as SiC or extruded SiC;
    in an additional embodiment the first and second layers of each multilayer protrusion may be respectively associated to two neighboring grooves;
    the first layer of each multilayer protrusion may comprise a slot extending between the second extremities and comprising an additional insert made of a material having a hardness intended for increasing hardness of this first layer;
      the additional insert may be made of a ceramic or of a wear-resistant and/or heat-resistant steel;
  the inner face of the copper body may comprise ribs having at least two different heights;
  the grooves may have a dovetail cross-section.

The invention also provides a blast furnace comprising at least one cooling plate as described above.

BRIEF DESCRIPTION OF THE DRAWINGS

Other characteristics and advantages of the invention will emerge clearly from the description of it that is given below by way of an indication and which is in no way restrictive, with reference to the appended figures in which.

DETAILED DESCRIPTION

The present invention provides a cooling plate (or stave) 1 that can be used in a blast furnace and presenting an increased wear resistance.

Figure 1:
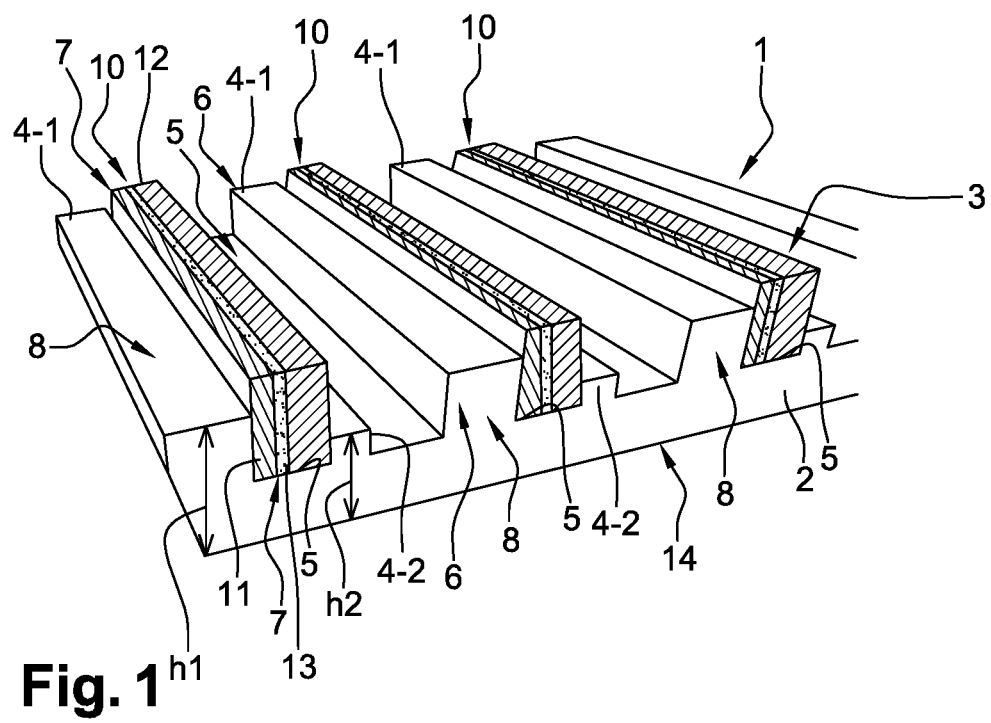
FIG. 1 illustrates schematically, in a perspective view, a part of a first example of an embodiment of a cooling plate according to the present invention.

An example of an embodiment of a cooling plate (or stave) 1 according to the present invention is illustrated in FIG. 1. Such a cooling plate (or stave) 1 is intended to be mounted on an inner wall of a blast furnace.

As illustrated, a cooling plate (or stave) 1 according to the present invention comprises a copper body 2 having an inner (or hot) face 3 comprising several ribs 4-j parallel therebetween. These ribs 4-j have first extremities 6 opposite therebetween and are separated by grooves 5 having second extremities 7 opposite therebetween. Once the cooling plate 1 is mounted on the blast furnace inner wall, its ribs 4-j and grooves 5 are arranged horizontally. In this case, the copper body 2 comprises an outer face 14 that is opposite to its inner face 3 and fixed to the inner wall blast furnace. So, the inner face 3 is the body face that can be in contact with the very hot material and gas present inside the blast furnace.

Figure 2:
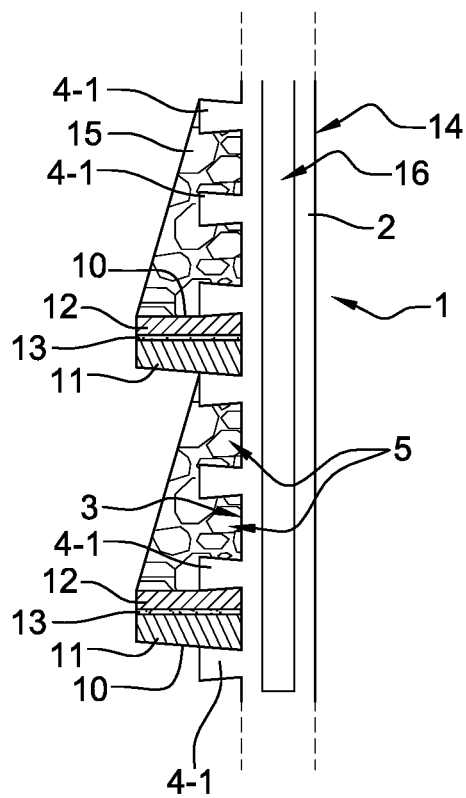
FIG. 2 illustrates schematically, in a cross section view, a part of a second example of an embodiment of a cooling plate according to the present invention.
Figure 3:
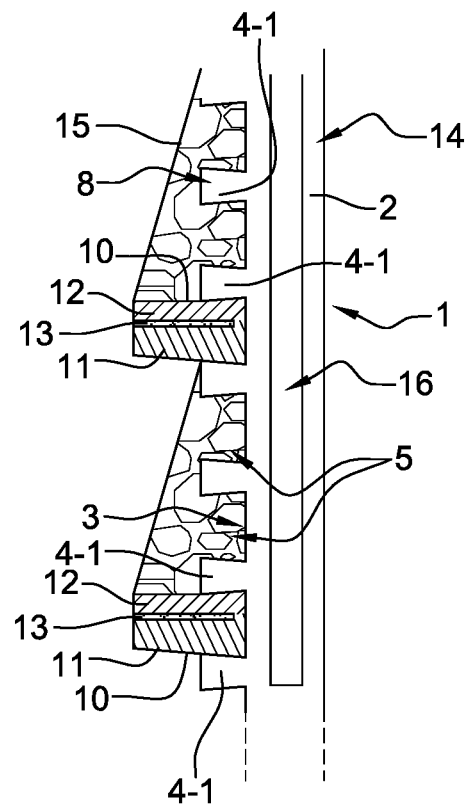
FIG. 3 illustrates schematically, in a cross section view, a variant of the cooling plate illustrated in FIG. 2.
Figure 4:
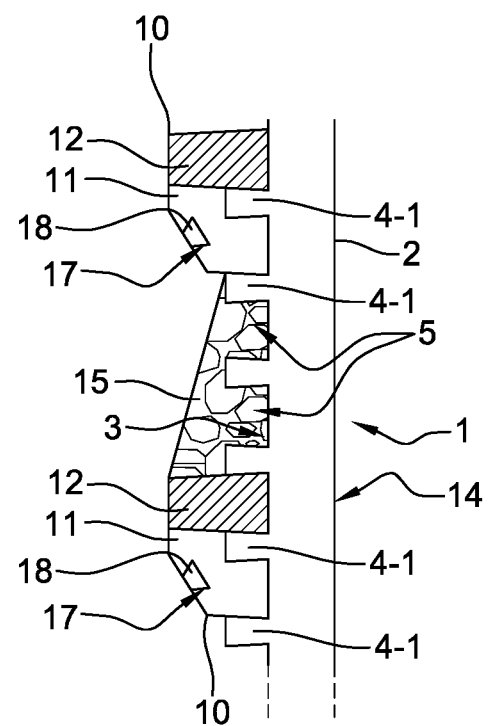
FIG. 4 illustrates schematically, in a cross section view, a part of a third example of an embodiment of a cooling plate according to the present invention.

For instance, and as illustrated in FIGS. 2 to 4, the grooves 5 may have a dovetail cross-section in order to optimize anchorage of refractory bricks 15. But, the ribs 4-j and grooves 5 may also have other cross-section shapes. Although dovetail cross-section of the grooves 5 is preferred, in particular for receiving the multilayer protusions 10, as illustrated in FIG. 1, the grooves 5 may also have a rectangular cross-section.

More, and as illustrated in the non-limiting example of FIG. 1, the inner face 3 of the copper body 2 may comprise ribs 4-j having at least two different heights h1 and h2. This option allows optimizing anchorage of refractory bricks 15. In the example of FIG. 1, first ribs 4-1 (j=1) have a first height h1 and second ribs 4-2 (j=2), defined between first ribs 4-1, have a second height h2 that is smaller than the first height h1. But, as illustrated in the other examples of embodiments of FIGS. 2 to 4, the copper body 2 may comprise ribs 4-1 having the same height.

Still more, and as illustrated in FIGS. 2 and 3, the copper body 2 comprises preferably internal channels 16 in which a cooling fluid flows.

As illustrated in FIGS. 1 to 4, at least one of the grooves 5 comprises at least a part of a multilayer protrusion 10 extending between its second extremities 7 and comprising at least one layer 12 made of this wear resistant material that increases locally the wear resistance of the neighboring ribs 4-j.

Thanks to the multilayer protrusions 10 (located into grooves 5), the speed and pressure exerted by the descending burden on the stave are appreciably decreased, which allows avoiding an early erosion of their material (i.e. copper or copper alloy) and of the stave body. In other words, the protrusions allow generating an area of low material movement to minimize wear.

For instance, the wear resistant material of layer 12 may be a metal or a ceramic. This wear resistant metal may be, for instance a steel or cast iron, preferably a refractory grade (for example a heat-resistant casting steel such as GX40CrSi13 in which the chemical composition comprises, the contents being expressed as weight percentages: 0.3%≤C≤0.5%, 1%≤Si≤2.5%, 12≤Cr≤14%, Mn≤1%, Ni≤1%, P≤0.04%, S≤0.03% and Mo≤0.5%) or a wear-resistant steel able to work at high temperatures. The wear resistant ceramic may be, for instance, a silicon carbide (SiC), extruded silicon carbide (higher thermal conductivity) or other refractory material with good resistance to spalling and high hardness.

For instance and as illustrated in FIGS. 1 to 4, a multilayer protrusion 10 may comprise a first layer 11 made of a material having a high thermal conductivity, and a second layer 12 made of the wear resistant material and set on top of this first layer 11. This embodiment allows, e.g., an adaptation of a conventional cooling plate without any machining phase.

The first layer 11 having a high thermal conductivity is laid in the lowest position of the multilayer protrusion 10 to act as a heat shield, because the thermal load is coming mainly from hot gas streams flowing upwards. For instance, the material of this first layer 11 may be a high conductivity metal copper or a copper alloy. The second layer 12 is made of the wear resistant material and laid on top of the first layer 11 to protect it from an early erosion. As mentioned before, this second layer 12 can be made of a wear resistant steel, cast iron or ceramic.

Also for instance, and as illustrated in FIGS. 1 to 3, each multilayer protrusion 10 may be associated to a single groove 5. In other word a part of each multilayer protrusion 10 is located into a single groove 5 while the remaining part of this multilayer protrusion 10 extends beyond this single groove 5.

In this case, each multilayer protrusion 10 may further comprise a third layer 13 sandwiched between the first 11 and second 12 layers and made of a ceramic material having a very high hardness, intended for increasing the wear resistance of the whole protrusion.

In the examples of FIGS. 1 and 2, each third layer 13 is in contact with a part of the inner face 3 that delimitates the base of its associated groove 5, while in the example of FIG. 3, each third layer 13 is separated by a protruding part of the underlying first layer 11 from the part of the inner face 3 that delimitates the base of its associated groove 5. The alternative shown in FIGS. 1 and 2 can be installed on the stave from the front side, while the alternative displayed in FIG. 3 can only be installed sideways inside the groove. The advantage of this latter embodiment is the higher stability of the set in case the brittle ceramic piece would be broken in pieces.

For instance, each third layer 13 may be made of a high-hardness ceramic such as SiC or extruded SiC. A ceramic can be used here because it is sandwiched and therefore protected from impact of falling material and independent of the cooling plate bending that can be induced by a thermal expansion.

In a variant of an embodiment, illustrated in FIG. 4, the first 11 and second 12 layers of each multilayer protrusion 10 may be respectively associated to two neighboring grooves 5. In other words, a part of the first layer 11 of a multilayer protrusion 10 is located into a first groove 5, while the remaining part of this first layer 11 extends beyond this first groove 5, and a part of the second layer 12 of this multilayer protrusion 10 is located into a second groove 5 located near the first groove 5, while the remaining part of this second layer 12 extends beyond this second groove 5. So, the first layer 11 in the lower part takes the heat load towards the copper body 2, while the second layer 12 on top protects the associated first layer 11 from wear.

In this case, and as illustrated in the non-limiting example of FIG. 4, the first layer 11 of each multilayer protrusion 10 may comprise a slot 17 extending between the second extremities 7 and comprising an insert 18. This insert 18, embedded in a first layer 11, is made of a material having a hardness intended for increasing hardness of this first layer 11. For instance, and as illustrated in the non-limiting example of FIG. 4, the face of the first layer 11, in which the slot 17 is defined (or machined), may be inclined to send the gas outwards and also to help the burden flow smoothly into the "pockets" that are built with the protrusions 10.

Also for instance, and as illustrated in FIG. 4, each slot 17, and therefore the associated insert 18, may have a dovetail cross-section. Also for instance, each insert 18 may be made of a ceramic such as SiC or a steel (wear-resistant, heat-resistant or a combination of both). Other implementations to increase the hardness of the layer 11 can be used. For example, each slot 17 may be a threaded hole in which a bolt, defining an insert 18, is screwed It is important to note that the grooves 5 in which the multilayer protrusions 10 are located may depend on the shape and/or dimensions of the blast furnace. For instance, in the embodiments illustrated in FIGS. 2 and 3 a multilayer protrusion 10 may be located every three grooves 5. But, in other embodiments, a multilayer protrusion 10 may be located every two or four or even five grooves 5.

What is claimed is:

1. A cooling plate for a blast furnace, said cooling plate comprising a copper body having an inner face having a plurality of parallel ribs separated by grooves, the ribs having first extremities facing laterally away from the copper body, the grooves having second extremities facing laterally away from the copper body, wherein at least one of said grooves includes at least a part of a multilayer protrusion extending between said second extremities, the multilayer protrusion having at least two layers made of different materials, and wherein at least one of the two layers is made of a wear resistant material that increases locally the wear resistance of neighboring ribs.

2. The cooling plate according to claim 1, wherein said wear resistant material is chosen from a group comprising a metal and a ceramic.

3. The cooling plate according to claim 2, wherein that said metal is a wear-resistant steel or cast iron.

4. The cooling plate according to claim 2, wherein said wear resistant ceramic is silicon carbide, an extruded silicon carbide or other refractory material with good resistant to spalling and high hardness.

5. The cooling plate according to claim 1, wherein said inner face of said copper body comprises ribs having at least two different heights.

6. The cooling plate according to claim 1, wherein said grooves have a dovetail cross-section.

7. A cooling plate for a blast furnace, said cooling plate comprising a copper body having an inner face having a plurality of parallel ribs separated by grooves, the ribs having first extremities facing laterally away from the copper body, the grooves having second extremities facing laterally away from the copper body, wherein at least one of said grooves includes at least a part of a multilayer protrusion extending between said second extremities and comprising at least one layer made of a wear resistant material that increases locally the wear resistance of neighboring ribs, wherein said multilayer protrusion comprises a first layer made of a material having a high thermal conductivity, and a second layer made of said wear resistant material and set on top of said first layer.

8. The cooling plate according to claim 7, wherein said material of said first layer is chosen from a group comprising a high conductivity metal copper and a copper alloy.

9. The cooling plate according to claim 7, wherein said multilayer protrusion is associated to a single groove.

10. The cooling plate according to claim 9, wherein said multilayer protrusion further comprises a third layer sandwiched between said first and second layers and made of a material having a hardness intended for increasing hardness of said multilayer protrusion.

11. The cooling plate according to claim 10, wherein said third layer is made of a ceramic with good resistance to spalling and high hardness.

12. The cooling plate according to claim 7, wherein the first and second layers of said multilayer protrusion are respectively associated to two neighboring grooves.

13. The cooling plate according to claim 12, wherein said first layer comprises a slot extending between said second extremities and comprising an insert made of a material having a hardness intended for increasing hardness of said first layer.

14. The cooling plate according to claim 13, wherein said insert is made of a ceramic or a wear-resistant and/or heat-resistant steel.

15. The cooling plate according to claim 11, wherein said ceramic with good resistance to spalling and high hardness comprises SiC or extruded SiC.

* * * * *